US009371740B2

(12) United States Patent
Jahami

(10) Patent No.: US 9,371,740 B2
(45) Date of Patent: Jun. 21, 2016

(54) OPERATION CONTROL APPARATUS AND OPERATION CONTROL METHOD FOR STEAM TURBINE

(75) Inventor: Kazuhiro Jahami, Hiroshima (JP)

(73) Assignee: MITSUBISHI HEAVY INDUSTRIES COMPRESSOR CORPORATION, Tokyo (JP)

(*) Notice: Subject to any disclaimer, the term of this patent is extended or adjusted under 35 U.S.C. 154(b) by 475 days.

(21) Appl. No.: 13/989,992

(22) PCT Filed: Jul. 25, 2011

(86) PCT No.: PCT/JP2011/066820
§ 371 (c)(1),
(2), (4) Date: May 28, 2013

(87) PCT Pub. No.: WO2012/114557
PCT Pub. Date: Aug. 30, 2012

(65) Prior Publication Data
US 2013/0243574 A1 Sep. 19, 2013

(30) Foreign Application Priority Data

Feb. 25, 2011 (JP) .................................. 2011-040724

(51) Int. Cl.
F01D 17/20 (2006.01)
F01K 7/38 (2006.01)
(Continued)

(52) U.S. Cl.
CPC . *F01D 17/20* (2013.01); *F01K 7/38* (2013.01); *F01K 13/02* (2013.01); *F02C 9/18* (2013.01); *F05D 2270/02* (2013.01); *F05D 2270/301* (2013.01)

(58) Field of Classification Search
CPC .......... F01D 17/20; F01K 7/38; F01K 13/02; F02C 9/18; F05D 2270/02; F05D 2270/301
See application file for complete search history.

(56) References Cited

U.S. PATENT DOCUMENTS 4,057,715 A * 11/1977 Jones ...................... F01K 13/02
415/15
4,220,869 A * 9/1980 Uram ...................... F01D 17/24
290/40 R (Continued)

FOREIGN PATENT DOCUMENTS

CN 1053660 8/1991
JP 55-146205 11/1980

(Continued)

OTHER PUBLICATIONS

Written Opinion of the International Searching Authority (with partial translation) issued Sep. 6, 2011 in International (PCT) Application No. PCT/JP2011/066820.

(Continued)

*Primary Examiner* — Igor Kershteyn
(74) *Attorney, Agent, or Firm* — Wenderoth, Lind & Ponack, L.L.P.

(57) ABSTRACT

A speed controller generates a speed control output signal based on an output target value and a detected speed of a steam turbine, an extraction pressure controller generates an extraction pressure control output signal based on an extraction flow rate target value and a detected extraction pressure of the steam turbine, and when operation signals of a governor valve and an extraction control valve are generated with reference to an extraction map for deriving opening degrees of the valves at an operation point determined depending on the signals, the extraction map is used with a scale of the extraction pressure control output signal in the extraction map being corrected to be multiplied by "extraction flow rate target value/extraction flow rate actual value" based on a regularly detected extraction flow rate actual value of the steam turbine.

6 Claims, 7 Drawing Sheets

(51) Int. Cl.
*F02C 9/18* (2006.01)
*F01K 13/02* (2006.01)

(56) References Cited

U.S. PATENT DOCUMENTS

| | | | | |
|---|---|---|---|---|
| 4,245,162 | A | * | 1/1981 | Ronnen .................. F01D 17/18 290/40 R |
| 4,471,446 | A | * | 9/1984 | Podolsky .................. F01K 9/04 415/17 |
| 4,474,012 | A | * | 10/1984 | Chamberlain .......... F01K 13/02 60/646 |
| 4,577,281 | A | * | 3/1986 | Bukowski ............... F01D 17/24 60/660 |
| 4,788,647 | A | * | 11/1988 | McManus ............... F01K 13/02 340/3.7 |
| 4,888,954 | A | * | 12/1989 | Silvestri, Jr. ............ F01K 7/165 60/652 |
| 4,976,108 | A | | 12/1990 | Binstock et al. |
| 5,170,629 | A | * | 12/1992 | Sindelar .................. F01K 13/02 415/14 |
| 8,197,182 | B2 | * | 6/2012 | Hernandez ............... F01D 3/02 415/93 |

FOREIGN PATENT DOCUMENTS

| | | |
|---|---|---|
| JP | 62-67209 | 3/1987 |
| JP | 5-39703 | 2/1993 |
| JP | 2003-301935 | 10/2003 |
| JP | 2006-90287 | 4/2006 |
| JP | 2010-8121 | 1/2010 |

OTHER PUBLICATIONS

International Search Report issued Sep. 6, 2011 in International (PCT) Application No. PCT/JP2011/066820.

Notice of Allowance issued on Dec. 25, 2014 in corresponding Chinese patent application No. 201180057168.0.

Office Action issued Jul. 29, 2014 in corresponding Chinese patent application No. 2011800571680 (with English translation).

Decision to Grant a Patent issued Jul. 8, 2014 in corresponding Japanese patent application No. 2011-040724 (with English translation).

* cited by examiner

OPERATION CONTROL APPARATUS AND OPERATION CONTROL METHOD FOR STEAM TURBINE

TECHNICAL FIELD

The present invention relates to an operation control apparatus and an operation control method for a steam turbine, and more particularly to an operation control apparatus and an operation control method for a steam turbine that generates a valve opening degree control signal based on an extraction map to control operation.

BACKGROUND ART

An extraction turbine is known that extracts steam from an intermediate stage of a steam turbine, and supplies the steam to a process system such as a plant for use (for example, Patent Literature 1). FIG. 7 illustrates configurations of a conventional steam turbine and peripherals thereof. In FIG. 7, a steam turbine 110 includes a high-pressure turbine 11, a low-pressure turbine 12, a governor valve 14 that controls a flow rate of steam to be supplied to the high-pressure turbine 11, and an extraction control valve 15 that controls a flow rate of steam to be supplied from the high-pressure turbine 11 to the low-pressure turbine 12. A generator 13 is directly connected to the steam turbine 110.

An electronic governor 51 is also provided as an operation control apparatus for a steam turbine, and the electronic governor 51 includes a speed controller 52 that generates a speed control output signal S11 based on an output target value of the steam turbine 110 and a speed signal S1 from a speed detector 41, an extraction pressure controller 53 that generates an extraction pressure control output signal S12 based on an extraction flow rate target value of the steam turbine 110 and an extraction pressure signal S2 from an extraction pressure detector 42, and an extraction map 54 for deriving opening degrees of the governor valve 14 and the extraction control valve 15 at an operation point determined depending on the speed control output signal S11 and the extraction pressure control output signal S12. The extraction map 54 is converted to generate a GV operation signal S21 for operating the governor valve 14 and an ECV operation signal S22 for operating the extraction control valve 15.

CITATION LIST

Patent Literature

{PTL 1}
Japanese Unexamined Patent Application, Publication No. S62-67209

SUMMARY OF INVENTION

Technical Problem

As such, in the conventional technique, the speed control output signal S11 corresponding to an output of the steam turbine 110 and the extraction pressure control output signal S12 corresponding to an extraction flow rate of the steam turbine 110 are converted into the opening degree of the governor valve 14 and the opening degree of the extraction control valve 15 based on the extraction map 54 to control operation. If there is a deviation between an actual apparatus and an assumption (plan) in a relationship of the opening degree of the governor valve 14 and the opening degree of the extraction control valve 15 in the actual apparatus relative to an assumed output of the steam turbine 110 and an assumed extraction flow rate of the steam turbine 110, a deviation is generated between an operation point on an assumed extraction map 54 and an actual operation point, and operation according to the assumed operation control is not performed, which may prevent machine performance inherent in the actual apparatus from being achieved.

The present invention is achieved in view of the above described conventional circumstances, and has an object to provide an operation control apparatus and an operation control method for a steam turbine that can correct a deviation between an operation point on an extraction map used for controlling operation of the steam turbine and an actual operation point to allow operation according to assumed operation control and achieve machine performance inherent in the actual apparatus.

Solution to Problem

To achieve the above described object, the present invention adopts the following solutions.

A first aspect of the present invention provides an operation control apparatus for a steam turbine including at least a high-pressure turbine and a low-pressure turbine, the steam turbine further including a governor valve that controls a flow rate of steam to be supplied to the high-pressure turbine, and an extraction control valve that controls a flow rate of steam to be supplied from the high-pressure turbine to the low-pressure turbine, the operation control apparatus comprising: a speed controller that generates a speed control output signal based on an output target value of the steam turbine and a detected speed of the steam turbine; an extraction pressure controller that generates an extraction pressure control output signal based on an extraction flow rate target value of the steam turbine and a detected extraction pressure of the steam turbine; and an extraction map for deriving opening degrees of the governor valve and the extraction control valve at an operation point, the opening degrees being determined depending on the speed control output signal and the extraction pressure control output signal, wherein a scale of the extraction pressure control output signal in the extraction map is modified to be multiplied by "the extraction flow rate target value/an extraction flow rate actual value" based on the extraction flow rate actual value of the steam turbine which is regularly detected, and operation signals for operating the governor valve and the extraction control valve are generated with reference to the modified extraction map.

According to the first aspect of the present invention, the extraction map is modified based on the regularly detected extraction flow rate actual value, and the opening degree of the governor valve and the opening degree of the extraction control valve are adjusted based on the modified extraction map. Thus, a deviation between an operation point on the extraction map used for controlling operation of the steam turbine and an actual operation point can be corrected to allow operation according to assumed operation control and reliably achieve machine performance inherent in the actual apparatus.

In the operation control apparatus for a steam turbine according to the first aspect of the present invention, it is preferable that a scale of the speed control output signal in the extraction map is modified to be multiplied by "an output actual value/an output target value" based on the output actual value of the steam turbine which is regularly detected, and operation signals for operating the governor valve and the extraction control valve are generated with reference to the modified extraction map.

According to this configuration, the extraction map is further modified based on the regularly detected output actual value, and the opening degree of the governor valve and the opening degree of the extraction control valve are adjusted based on the modified extraction map. Thus, a deviation between an operation point on the extraction map used for controlling operation of the steam turbine and an actual operation point can be corrected to allow operation according to assumed operation control and better achieve machine performance inherent in the actual apparatus reliably.

A second aspect of the present invention provides an operation control apparatus for a steam turbine including at least a high-pressure turbine and a low-pressure turbine, the steam turbine further including a governor valve that controls a flow rate of steam to be supplied to the high-pressure turbine, and an extraction control valve that controls a flow rate of steam to be supplied from the high-pressure turbine to the low-pressure turbine, the operation control apparatus comprising: a speed controller that generates a speed control output signal based on an output target value of the steam turbine and a detected speed of the steam turbine; an extraction pressure controller that generates an extraction pressure control output signal based on an extraction flow rate target value of the steam turbine and a detected extraction pressure of the steam turbine; and an extraction map for deriving opening degrees of the governor valve and the extraction control valve at an operation point, the opening degrees being determined depending on the speed control output signal and the extraction pressure control output signal, wherein wherein a scale of the speed control output signal in the extraction map is modified to be multiplied by "an output actual value/an output target value" based on the output actual value of the steam turbine which is regularly detected, and operation signals for operating the governor valve and the extraction control valve are generated with reference to the modified extraction map.

According to the second aspect of the present invention, the extraction map is modified based on the regularly detected output actual value, and the opening degree of the governor valve and the opening degree of the extraction control valve are adjusted based on the modified extraction map. Thus, a deviation between an operation point on the extraction map used for controlling operation of the steam turbine and an actual operation point can be corrected to allow operation according to assumed operation control and reliably achieve machine performance inherent in the actual apparatus.

A third aspect of the present invention provides an operation control method for a steam turbine including at least a high-pressure turbine and a low-pressure turbine, the steam turbine further including a governor valve that controls a flow rate of steam to be supplied to the high-pressure turbine, and an extraction control valve that controls a flow rate of steam to be supplied from the high-pressure turbine to the low-pressure turbine, the operation control method comprising: a speed control step of generating a speed control output signal based on an output target value of the steam turbine and a detected speed of the steam turbine; an extraction pressure control step of generating an extraction pressure control output signal based on an extraction flow rate target value of the steam turbine and a detected extraction pressure of the steam turbine; and an operation signal generation step of generating operation signals for operating the governor valve and the extraction control valve with reference to an extraction map for deriving opening degrees of the governor valve and the extraction control valve at an operation point, the opening degrees being determined in the extraction map depending on the speed control output signal and the extraction pressure control output signal, wherein a scale of the extraction pressure control output signal in the extraction map is modified to be multiplied by "the extraction flow rate target value/an extraction flow rate actual value" based on the extraction flow rate actual value of the steam turbine which is regularly detected.

According to the third aspect of the present invention, the extraction map is modified based on the regularly detected extraction flow rate actual value, and the opening degree of the governor valve and the opening degree of the extraction control valve are adjusted based on the modified extraction map. Thus, a deviation between an operation point on the extraction map used for controlling operation of the steam turbine and an actual operation point can be modified to allow operation according to assumed operation control and reliably achieve machine performance inherent in the actual apparatus.

In the operation control apparatus for a steam turbine according to the third aspect of the present invention, it is preferable that a scale of the speed control output signal in the extraction map is modified to be multiplied by "an output actual value/an output target value" based on the output actual value of the steam turbine which is regularly detected.

According to this configuration, the extraction map is further modified based on the regularly detected output actual value, and the opening degree of the governor valve and the opening degree of the extraction control valve are adjusted based on the modified extraction map. Thus, a deviation between an operation point on the extraction map used for controlling operation of the steam turbine and an actual operation point can be corrected to allow operation according to assumed operation control and better achieve machine performance inherent in the actual apparatus reliably.

Further, a fourth aspect of the present invention provides an operation control method for a steam turbine including at least a high-pressure turbine and a low-pressure turbine, the steam turbine further including a governor valve that controls a flow rate of steam to be supplied to the high-pressure turbine, and an extraction control valve that controls a flow rate of steam to be supplied from the high-pressure turbine to the low-pressure turbine, the operation control method comprising: a speed control step of generating a speed control output signal based on an output target value of the steam turbine and a detected speed of the steam turbine; an extraction pressure control step of generating an extraction pressure control output signal based on an extraction flow rate target value of the steam turbine and a detected extraction pressure of the steam turbine; and an operation signal generation step of generating operation signals for operating the governor valve and the extraction control valve with reference to an extraction map for deriving opening degrees of the governor valve and the extraction control valve at an operation point, the opening degrees being determined in the extraction map depending on the speed control output signal and the extraction pressure control output signal, wherein a scale of the speed control output signal in the extraction map is modified to be multiplied by "an output actual value/an output target value" based on the output actual value of the steam turbine which is regularly detected.

According to the fourth aspect of the present invention, the extraction map is modified based on the regularly detected output actual value, and the opening degree of the governor valve and the opening degree of the extraction control valve are adjusted based on the modified extraction map. Thus, a deviation between an operation point on the extraction map used for controlling operation of the steam turbine and an actual operation point can be corrected to allow operation according to assumed operation control and reliably achieve machine performance inherent in the actual apparatus.

Advantageous Effects of Invention

According to the present invention, a deviation between an operation point on the extraction map used for controlling operation of the steam turbine and an actual operation point can be corrected to allow operation according to assumed operation control and reliably achieve machine performance inherent in the actual apparatus.

DESCRIPTION OF EMBODIMENTS

Now, a first embodiment and a second embodiment of an operation control apparatus and an operation control method for a steam turbine according to the present invention will be sequentially described in detail with reference to the drawings.

First Embodiment

Figure 1:
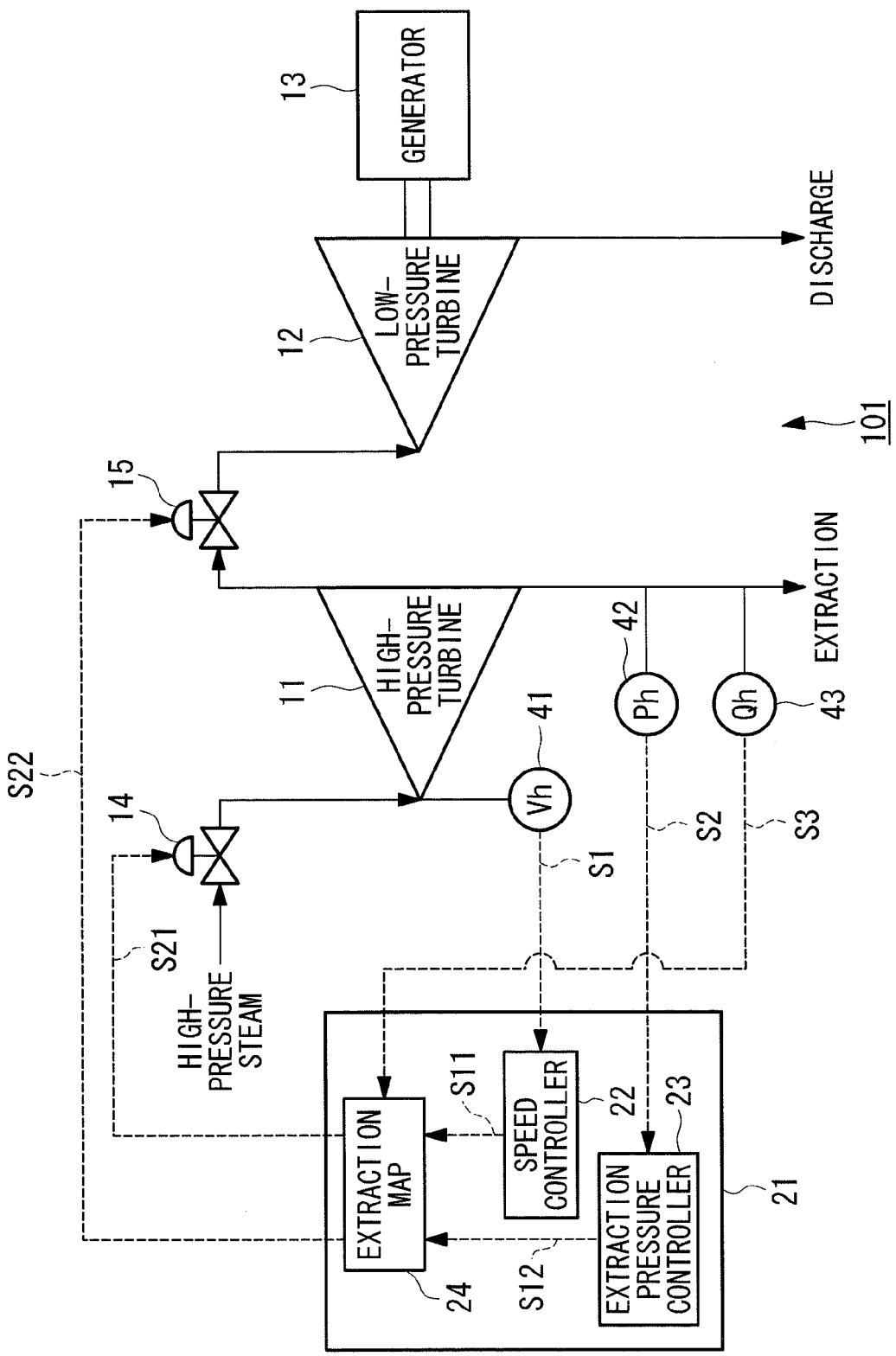
FIG. 1 is a configuration view of an operation control apparatus for a steam turbine according to a first embodiment of the present invention.
Figure 7:
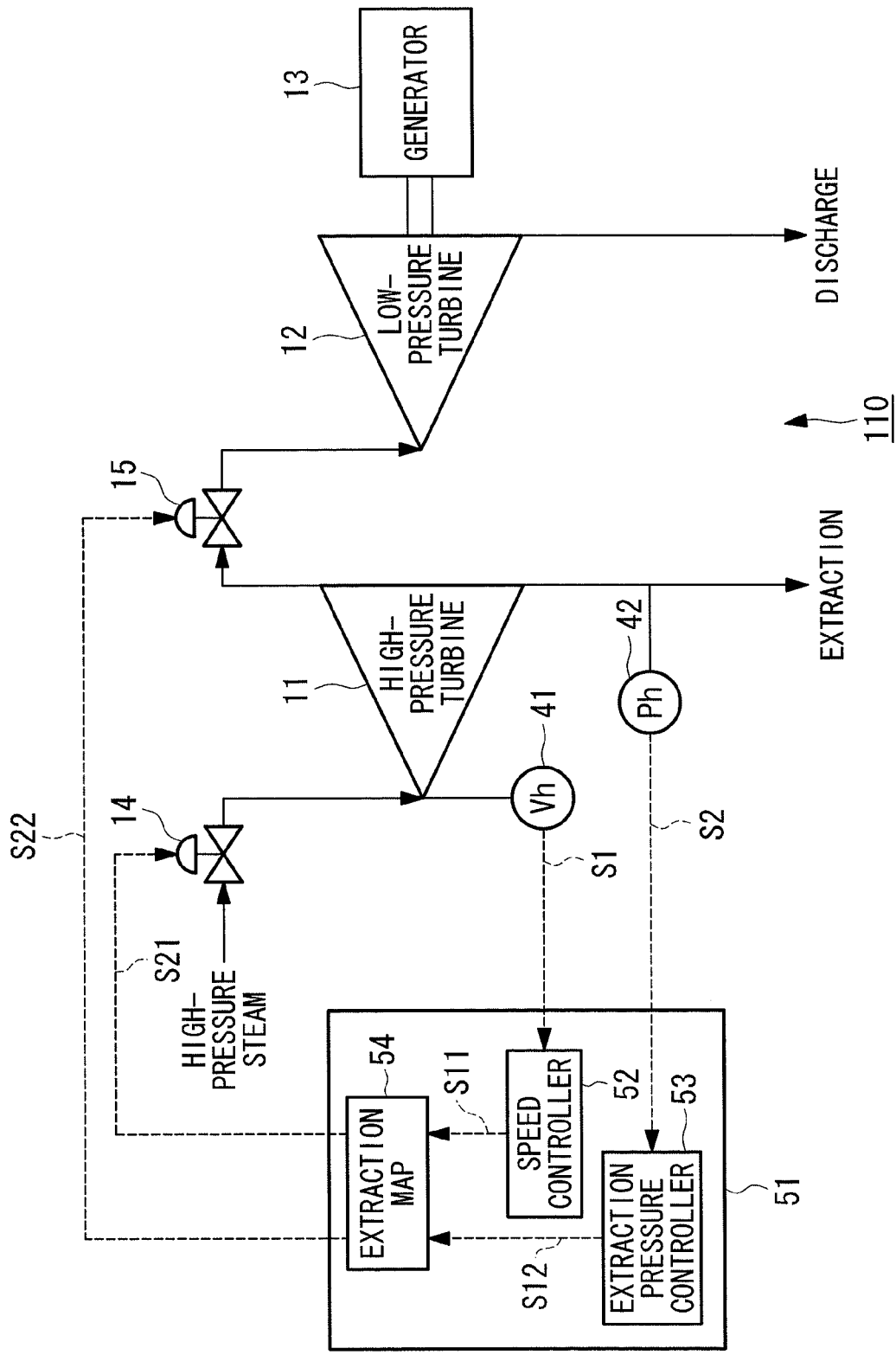
FIG. 7 is a configuration view of a conventional steam turbine and peripherals thereof.

FIG. 1 is a configuration view of an operation control apparatus for a steam turbine according to a first embodiment of the present invention. In FIG. 1, components which are the same as those in FIG. 7 (conventional example) are denoted by the same symbols.

In FIG. 1, a steam turbine 101 to be controlled by an operation control apparatus for a steam turbine according to this embodiment includes, similarly to a conventional steam turbine, a high-pressure turbine 11, a low-pressure turbine 12, a governor valve 14 that controls a flow rate of steam to be supplied to the high-pressure turbine 11, and an extraction control valve 15 that controls a flow rate of steam to be supplied from the high-pressure turbine 11 to the low-pressure turbine 12. A generator 13 is also connected to the steam turbine 101 directly or via a gear. The steam turbine 101 further includes, as detectors for detecting various physical amounts, a speed detector 41 that detects a rotational speed of the steam turbine 110 to output a speed signal S1, an extraction pressure detector 42 that detects extraction pressure of the steam turbine 110 to output an extraction pressure signal S2, and an extraction flow rate detector 43 that regularly detects an extraction flow rate of the steam turbine 110 to output an extraction flow rate signal S3.

An electronic governor 21 as the operation control apparatus for the steam turbine includes a speed controller 22 that generates a speed control output signal S11 based on an output target value of the steam turbine 101 and the speed signal S1 from the speed detector 41, an extraction pressure controller 23 that generates an extraction pressure control output signal S12 based on an extraction flow rate target value of the steam turbine 101 and the extraction pressure signal S2 from the extraction pressure detector 42, and an extraction map 24 for deriving opening degrees of the governor valve 14 and the extraction control valve 15 at an operation point determined depending on the speed control output signal S11 and the extraction pressure control output signal S12. The extraction map 24 is converted to generate a GV operation signal S21 for operating the governor valve 14 and an ECV operation signal S22 for operating the extraction control valve 15.

The extraction map 24 is modified regularly (for example, at intervals of 1 second) based on the extraction flow rate signal S3 from the extraction flow rate detector 43. Specifically, a scale of the extraction pressure control output signal in the extraction map 24 is modified to be multiplied by "extraction flow rate target value/extraction flow rate actual value" based on the extraction flow rate target value of the steam turbine 101 and the extraction flow rate actual value of the steam turbine 101 in current operation control. This modification corrects a deviation between an actual apparatus and an assumption (plan).

Figure 2:
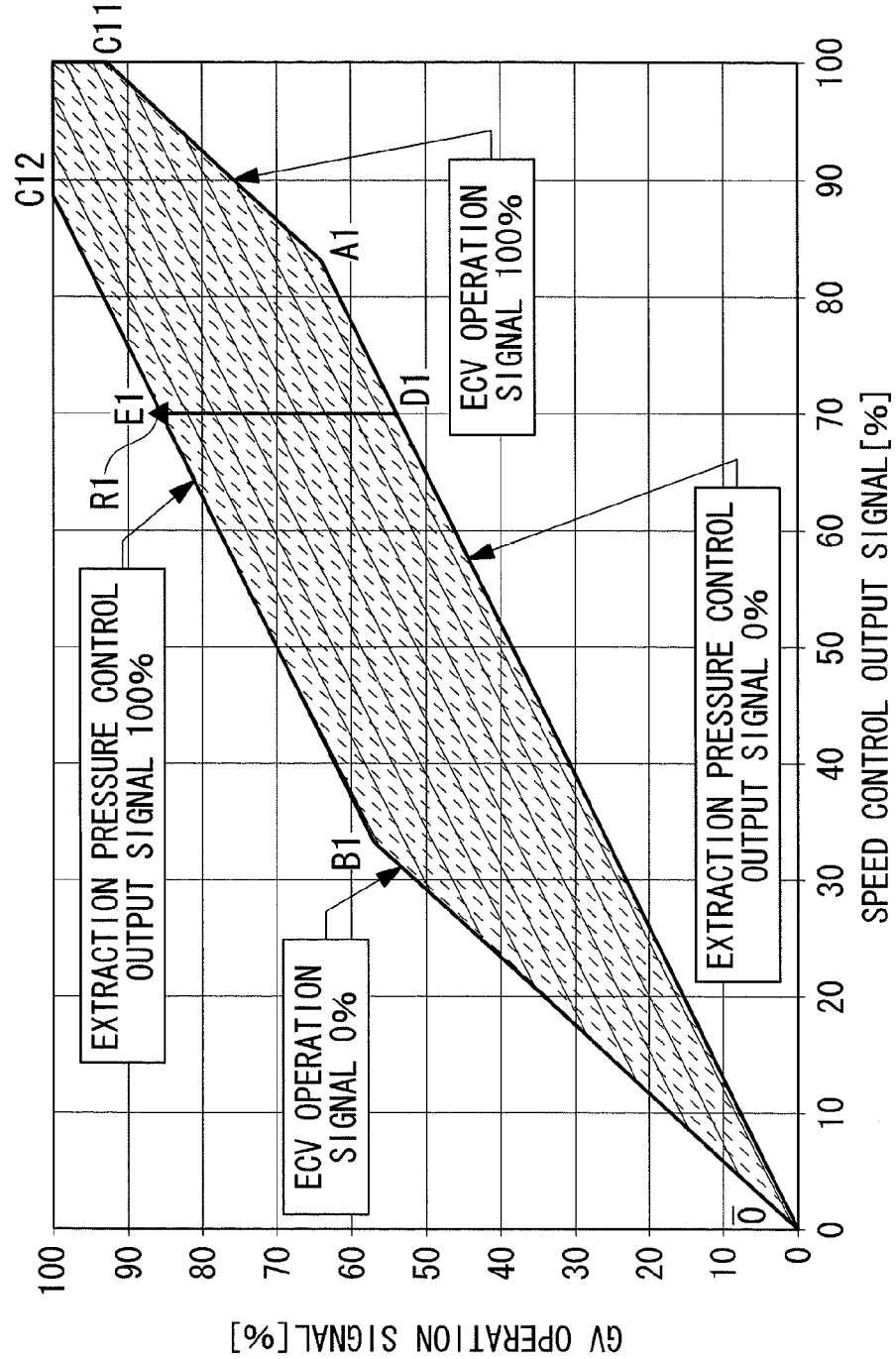
FIG. 2 illustrates an extraction map used for controlling operation of the steam turbine.
Figure 3:
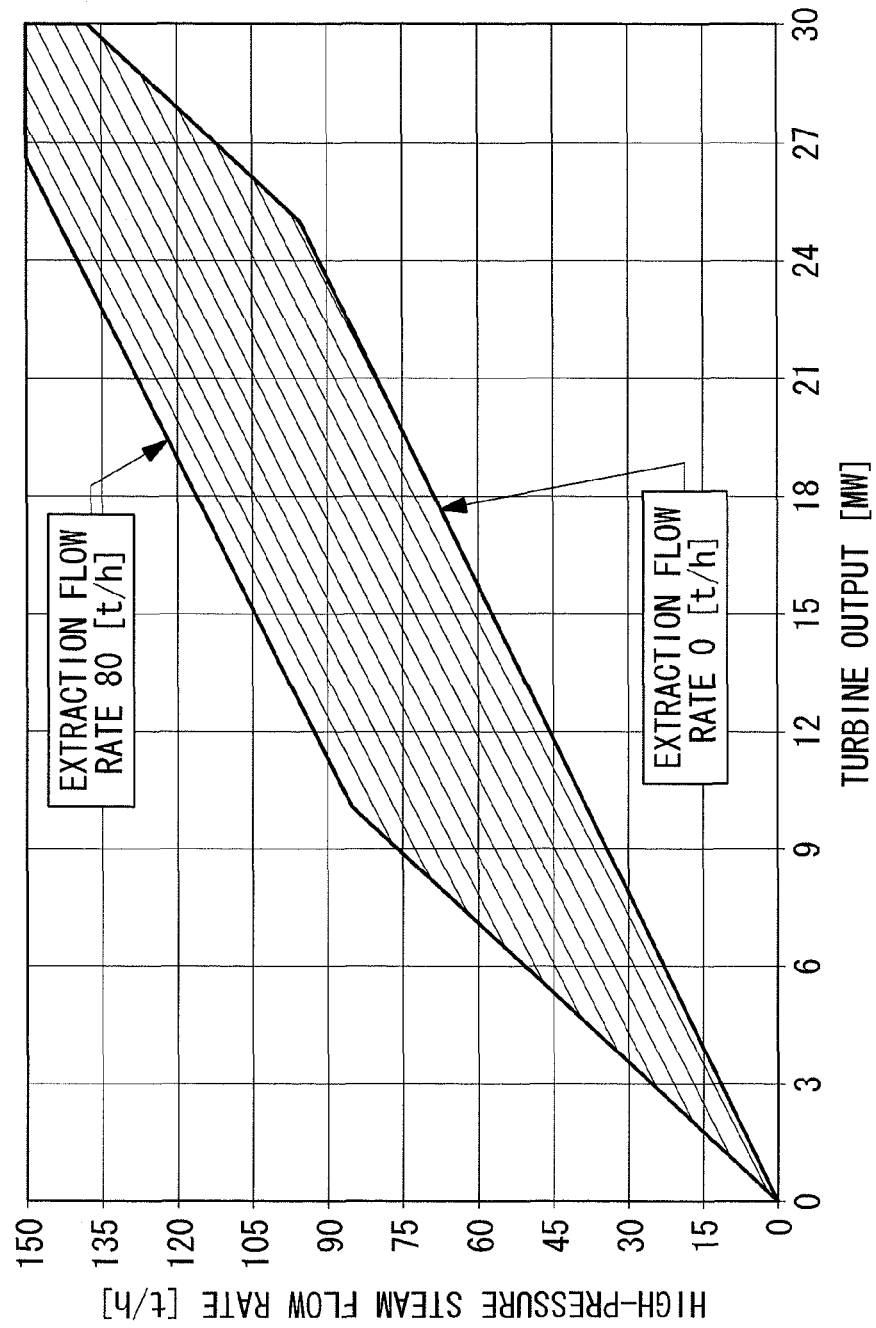
FIG. 3 illustrates a relationship between a high-pressure steam flow rate and a turbine output, which corresponds to the extraction map.
Figure 4:
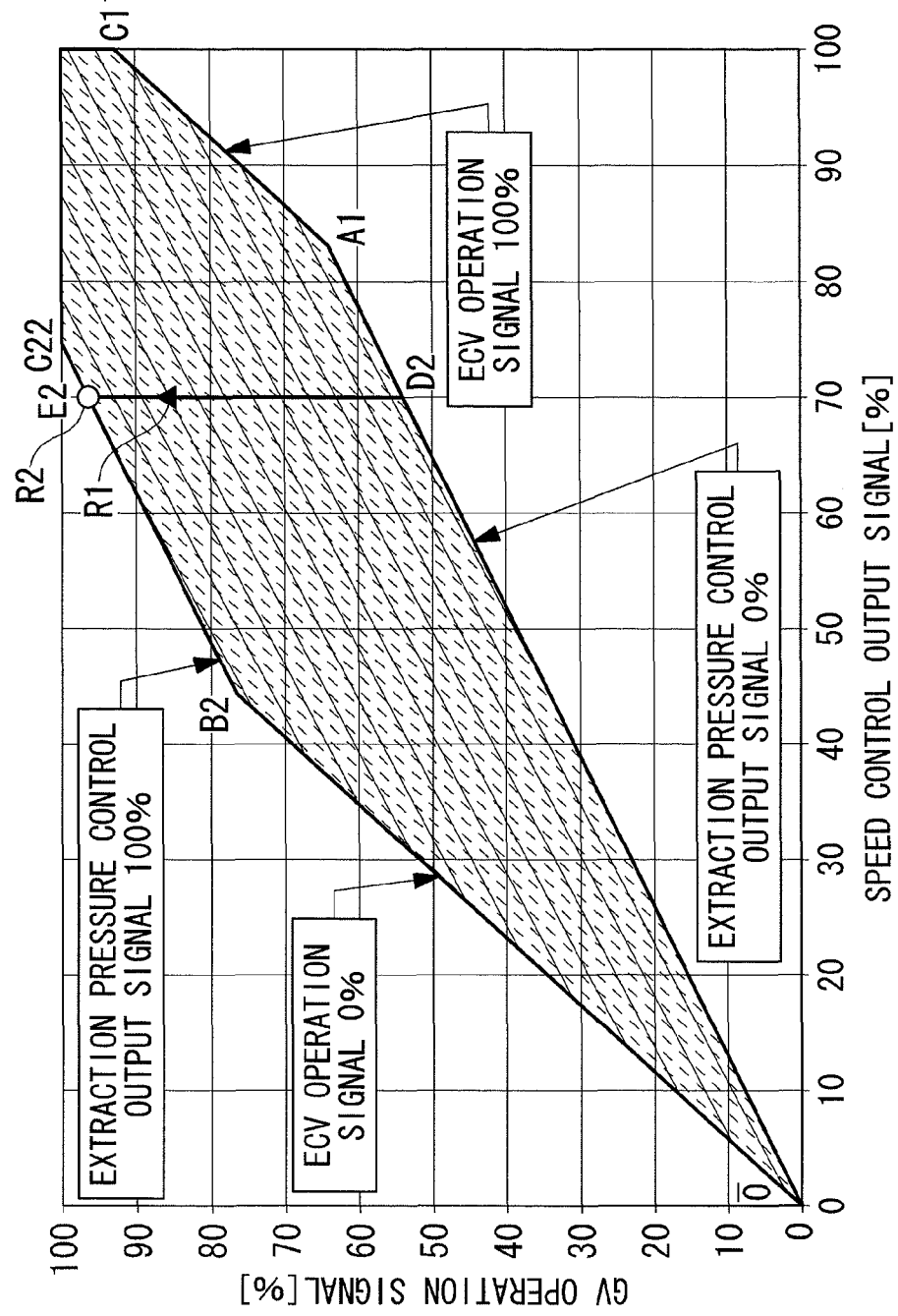
FIG. 4 illustrates a modified extraction map in the first embodiment.

With reference to FIGS. 2 to 4, an operation control method using the operation control apparatus for a steam turbine including the components as described above will be described below. FIG. 2 illustrates the extraction map used for controlling operation of the steam turbine in this embodiment, FIG. 3 illustrates a relationship between a high-pressure steam flow rate and a turbine output, which corresponds to the extraction map (FIG. 2), and FIG. 4 illustrates a modified extraction map in this embodiment.

First, the extraction map in FIG. 2 will be briefly described below. The extraction map 24 shows speed control output signals (percentage) on the abscissa and GV operation signals (percentage) (opening degree of the governor valve 14) on the ordinate, and correspondingly to the relationship therebetween, plots extraction pressure control output signals (percentage) on a scale from 0% (in FIG. 2, a line segment O-A1) to 100% (in FIG. 2, a line segment B1-C12) on the ordinate (in FIG. 2, indicated by dash-single-dot lines with 10% intervals). The extraction map 24 also plots ECV operation signals (percentage) (opening degree of the extraction control valve 15) on a scale from 0% (in FIG. 2, a line segment O-B1) to 100% (in FIG. 2, a line segment A1-C11) on the abscissa (in FIG. 2, indicated by dash-single-dot lines with 10% intervals).

For example, when the speed controller 22 outputs a speed control output signal S11 of 70%, and the extraction pressure controller 23 outputs an extraction pressure control output signal S12 of 100%, an operation point R1 is determined on the extraction map 24, and an opening degree of the governor valve 14 and an opening degree of the extraction control valve 15 at the operation point R1 are obtained. Specifically, the GV operation signal S21 is 85% and the ECV operation signal S22 is 46%.

In the extraction map, the speed control output signal (percentage) corresponds to a turbine output (MW), the GV operation signal (percentage) corresponds to a high-pressure steam flow rate (percentage), and the extraction pressure control output signal (percentage) corresponds to an extraction flow rate (t/h), and a relationship therebetween is shown in a control map in FIG. 3. The control map is prepared based on design data or the like so as to perform non-interference control in which opening degree control of the governor valve 14 does not interfere with opening degree control of the extraction control valve 15. In controlling operation of the steam turbine, the output target value and the extraction flow rate target value of the steam turbine 101 are set with reference to the control map. Specifically, in the specific examples of the numerical values described above, the output target value of the steam turbine 101 is set to 21 MW and the extraction flow rate target value thereof is set to 80 t/h.

Next, modification of the extraction map 24 will be described by illustrating a case where a deviation occurs between an actual apparatus and an assumption (plan). By the extraction flow rate signal S3 from the extraction flow rate detector 43, it is herein assumed that the extraction flow rate actual value is 60 t/h (actually, such a large deviation rarely occurs, but this example of the numerical value is used for clear description). In this case, the scale of the extraction pressure control output signal in the extraction map 24 is modified to be multiplied by "extraction flow rate target value/extraction flow rate actual value≈1.33" as shown in FIG. 4.

In FIG. 4, correspondingly to the relationship between the speed control output signal (percentage) and the GV operation signal (percentage), the modified extraction map 24 plots extraction pressure control output signals (percentage) on a scale from 0% (in FIG. 4, a line segment O-A1) to 100% (in FIG. 4, a line segment B2-C22) on the ordinate, and plots ECV operation signals (percentage) on a scale from 0% (in FIG. 4, a line segment O-B2) to 100% (in FIG. 4, a line segment A1-C11) on the abscissa.

Thus, although the operation point is R1 on the extraction map 24 in FIG. 2, by this modification, the operation point is R2 on the modified extraction map 24 in FIG. 4, and an opening degree of the governor valve 14 and an opening degree of the extraction control valve 15 at the operation point R2 are obtained. Then, the GV operation signal S21 becomes 96% and the ECV operation signal S22 becomes 32%.

Specifically, operation control is performed at the operation point R1 on the extraction map 24 in FIG. 2 according to the output target value of 21 MW and the extraction flow rate target value of 80 t/h of the steam turbine 101, but by a deviation between the actual apparatus and the assumed apparatus, the extraction flow rate is actually 60 t/h. Then, operation control can be performed at the operation point R2 on the modified extraction map 24 in FIG. 4, and thus the extraction flow rate can be 80 t/h.

The deviation between the actual apparatus and the assumption (plan) may occur, for example, relating to the governor valve 14, the extraction control valve 15, or the like. More specifically, this occurs in such a case that the ECV operation signal S22 is set to 0 to 100% to adjust the opening degree of the extraction control valve 15 to 0 to 80%, but actually, an opening degree adjustment range of the extraction control valve 15 is narrow (for example, 0 to 76%). In this case, a flow rate of steam is lower in the actual apparatus than in the assumption to cause a deviation, but modification in the extraction map 24 based on the actual apparatus can lead to making the actual operation performed along an assumed operation.

As described above, the operation control apparatus and the operation control method for a steam turbine according to this embodiment are the operation control apparatus and the operation control method for the steam turbine 101 including at least the high-pressure turbine 11 and the low-pressure turbine 12, the governor valve 14 that controls a flow rate of steam to be supplied to the high-pressure turbine 11, and the extraction control valve 15 that controls a flow rate of steam to be supplied from the high-pressure turbine 11 to the low-pressure turbine 12, wherein the speed controller 21 generates the speed control output signal S11 based on the output target value and the detected speed (S1) of the steam turbine 101 (speed control step), the extraction pressure controller 23 generates the extraction pressure control output signal S12 based on the extraction flow rate target value and the extraction pressure detection value (S2) of the steam turbine 101 (extraction pressure control step), and when the operation signals (S21 and S22) for operating the governor valve 14 and the extraction control valve 15 are generated with reference to the extraction map 24 for deriving the opening degrees of the governor valve 14 and the extraction control valve 15 at the operation point determined depending on the speed control output signal S11 and the extraction pressure control output signal S12 (operation signal generation step), the extraction map 24 is used with the scale of the extraction pressure control output signal S12 in the extraction map 24 being modified to be multiplied by "extraction flow rate target value/extraction flow rate actual value" based on the regularly detected extraction flow rate actual value (S3) of the steam turbine 101.

As such, the extraction map 24 is modified based on the regularly detected extraction flow rate actual value (S3), and the opening degree of the governor valve 14 and the opening degree of the extraction control valve 15 are adjusted based on the modified extraction map 24. Thus, the deviation between the operation point on the extraction map 24 used for controlling operation of the steam turbine 101 and the actual operation point can be corrected to allow operation according to assumed operation control and reliably achieve machine performance inherent in the actual apparatus.

Second Embodiment

Figure 5:
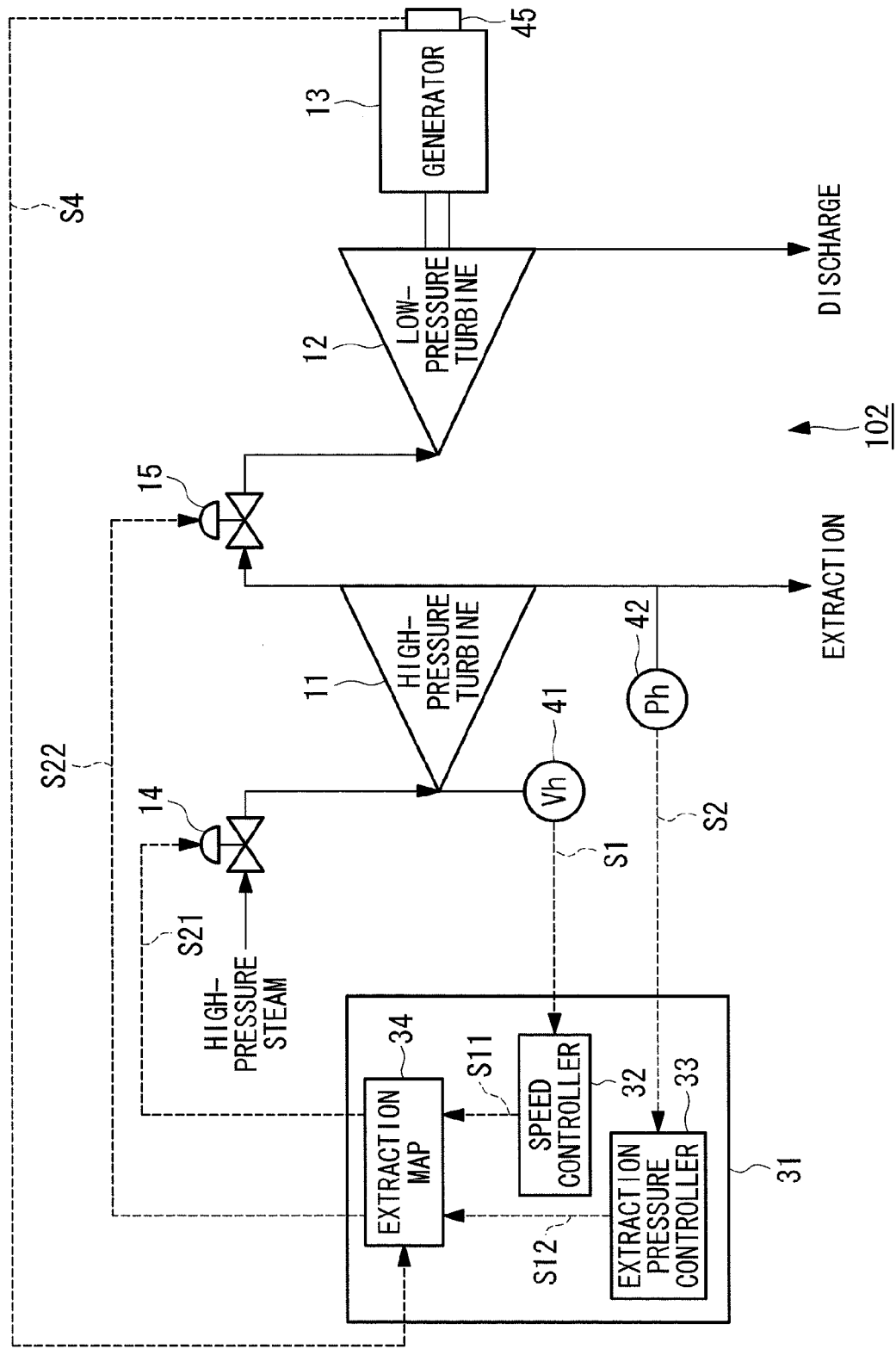
FIG. 5 is a configuration view of an operation control apparatus for a steam turbine according to a second embodiment of the present invention.

Next, FIG. 5 is a configuration view of an operation control apparatus for a steam turbine according to a second embodiment of the present invention. In FIG. 5, components which are the same as those in FIG. 1 (first embodiment) and FIG. 7 (conventional example) are denoted by the same reference symbols.

In FIG. 5, a steam turbine 102 to be controlled by an operation control apparatus for a steam turbine according to this embodiment includes, similarly to the first embodiment, a high-pressure turbine 11 and a low-pressure turbine 12, a governor valve 14 that controls a flow rate of steam to be supplied to the high-pressure turbine 11, and an extraction control valve 15 that controls a flow rate of steam to be supplied from the high-pressure turbine 11 to the low-pressure turbine 12. A generator 13 is connected to the steam turbine 102 directly or via a gear. Further, as detectors for detecting various physical amounts, a speed detector 41 that detects a rotational speed of the steam turbine 110 to output a speed signal S1, an extraction pressure detector 42 that detects extraction pressure of the steam turbine 110 to output an extraction pressure signal S2, and an output detector 45 that regularly detects an output of the generator 13 to output an output signal S4.

An electronic governor 31 as the operation control apparatus for the steam turbine includes a speed controller 32 that generates a speed control output signal S11 based on an output target value of the steam turbine 102 and the speed signal S1 from the speed detector 41, an extraction pressure controller 33 that generates an extraction pressure control output signal S12 based on an extraction flow rate target value of the steam turbine 102 and the extraction pressure signal S2 from the extraction pressure detector 42, and an extraction map 34 for deriving opening degrees of the governor valve 14 and the extraction control valve 15 at an operation point determined depending on the speed control output signal S11 and the extraction pressure control output signal S12. The extraction map 34 is converted to generate a GV operation signal S21 for operating the governor valve 14 and an ECV operation signal S22 for operating the extraction control valve 15.

The extraction map 34 is modified regularly (for example, at intervals of 1 second) based on the output signal S4 from the output detector 45. Specifically, based on the output target value of the steam turbine 102 and the output actual value of the steam turbine 102 in current operation control, a scale of the speed control output signal in the extraction map 34 is modified to be multiplied by "output actual value/output target value". This modification corrects a deviation between an actual apparatus and an assumption (plan).

Figure 6:
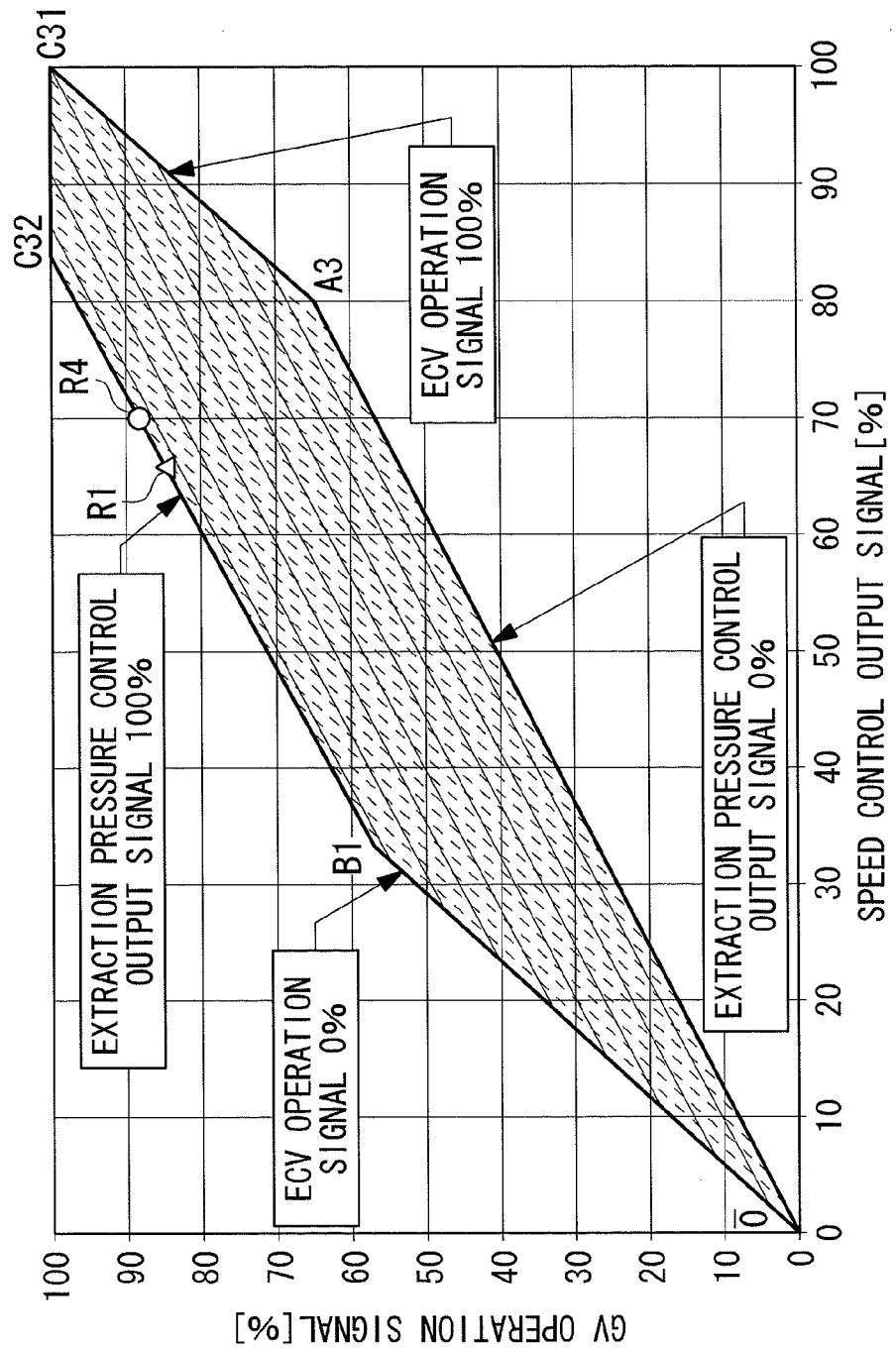
FIG. 6 illustrates a modified extraction map in the second embodiment.

Next, with reference to FIGS. 2 and 6, an operation control method using the operation control apparatus for a steam turbine including the components as described above will be described. FIG. 6 illustrates a modified extraction map in this embodiment.

It is assumed that current operation control is performed based on the extraction map 34 shown in FIG. 2 similarly to the first embodiment, and a case where a deviation occurs between an actual apparatus and an assumption (plan) and the extraction map 34 is modified will be described. Specifically, in accordance with the output signal S4 from the output detector 45, it is assumed that an output actual value is 21×0.96=20.16≈20.2 MW.

In this case, the scale of the speed control output signal in the extraction map 34 is modified to be multiplied by "output actual value/output target value≈0.96" as shown in FIG. 6.

In FIG. 6, correspondingly to a relationship between the speed control output signal (percentage) and the GV operation signal (percentage), the modified extraction map 34 plots extraction pressure control output signals (percentage) on a scale from 0% (in FIG. 6, a line segment O-A3) to 100% (in FIG. 6, a line segment B1-C32) on the ordinate, and plots ECV operation signals (percentage) on a scale from 0% (in FIG. 6, a line segment O-B1) to 100% (in FIG. 6, a line segment A3-C31) on the abscissa.

Thus, although the operation point is R1 on the extraction map 24 in FIG. 2, by this modification, the operation point is R4 on the modified extraction map 34 in FIG. 6, and an opening degree of the governor valve 14 and an opening degree of the extraction control valve 15 at the operation point R4 are obtained. Then, the GV operation signal S21 becomes 88% and the ECV operation signal S22 becomes 47%.

Specifically, according to the output target value of 21 MW and the extraction flow rate target value of 80 t/h of the steam turbine 102, operation control is performed at the operation point R1 on the extraction map 34 in FIG. 2, but by a deviation between the actual apparatus and the assumed condition, the output is actually 20.2 MW. Then, operation control is performed at the operation point R4 on the modified extraction map 34 in FIG. 6, and thus the output can be 21 MW.

As described above, the operation control apparatus and the operation control method for a steam turbine according to this embodiment are the operation control apparatus and the operation control method for the steam turbine 102 including at least the high-pressure turbine 11 and the low-pressure turbine 12, the governor valve 14 that controls a flow rate of steam to be supplied to the high-pressure turbine 11, and the extraction control valve 15 that controls a flow rate of steam to be supplied from the high-pressure turbine 11 to the low-pressure turbine 12, wherein the speed controller 31 generates the speed control output signal S11 based on the output target value and the detected speed (S1) of the steam turbine 102 (speed control step), the extraction pressure controller 33 generates the extraction pressure control output signal S12 based on the extraction flow rate target value and the extraction pressure detection value (S2) of the steam turbine 102 (extraction pressure control step), and when the operation signals (S21 and S22) for operating the governor valve 14 and the extraction control valve 15 are generated with reference to the extraction map 34 for deriving the opening degrees of the governor valve 14 and the extraction control valve 15 at the operation point determined depending on the speed control output signal S11 and the extraction pressure control output signal S12 (operation signal generation step), the extraction map 34 is used with the scale of the speed control output signal S11 in the extraction map 34 being modified to be multiplied by "output actual value/output target value" based on the regularly detected output actual value (S4) of the steam turbine 103.

As such, the extraction map 34 is modified based on the regularly detected output actual value (S4), and the opening degree of the governor valve 14 and the opening degree of the extraction control valve 15 are adjusted based on the modified extraction map 34. Thus, the deviation between the operation point on the extraction map 34 used for controlling operation of the steam turbine 102 and the actual operation point can be corrected to allow operation according to assumed operation control and reliably achieve machine performance inherent in the actual apparatus.

As described above, the embodiments of the present invention have been described in detail with reference to the drawings, but the present invention is not limited to the embodiments and modifications thereof, and the present invention covers design variations or the like without departing from the scope of the present invention. For example, the first embodiment and the second embodiment may be combined. Specifically, the output detector 45 that regularly detects the output of the generator 13 to output the output signal S4 is added to the configuration of the first embodiment (FIG. 1), and the extraction map 24 is modified based on the extraction flow rate signal S3 from the extraction flow rate detector 43 and the output signal S4 from the output detector 45. The modification may be performed in any order. Thus, the deviation between the operation point on the extraction map used for controlling operation of the steam turbine and the actual operation point can be corrected to allow operation according to assumed operation control and reliably achieve machine performance inherent in the actual apparatus.

In the above described embodiments, the steam turbine drives the generator as an example, but may drive a compressor, or further a pump or a fan. When the steam turbine does not drive the generator in the second embodiment, an output signal of a torque meter mounted on a turbine output shaft may be used instead of the output signal of the generator.

REFERENCE SIGNS LIST 11 high-pressure turbine
12 low-pressure turbine
13 generator
14 governor valve
15 extraction control valve
21, 31 electronic governor (operation control apparatus for steam turbine)
22, 32 speed controller 23, 33 extraction pressure controller
24, 34 extraction map
41 speed detector
42 extraction pressure detector
43 extraction flow rate detector
101, 102 steam turbine

The invention claimed is:

1. An operation control apparatus for a steam turbine including at least a high-pressure turbine and a low-pressure turbine, the steam turbine further including a governor valve that controls a flow rate of steam to be supplied to the high-pressure turbine, and an extraction control valve that controls a flow rate of steam to be supplied from the high-pressure turbine to the low-pressure turbine, the operation control apparatus comprising:
 a speed controller that generates a speed control output signal based on an output target value of the steam turbine and a detected speed of the steam turbine;
 an extraction pressure controller that generates an extraction pressure control output signal based on an extraction flow rate target value of the steam turbine and a detected extraction pressure of the steam turbine; and
 an extraction map for deriving opening degrees of the governor valve and the extraction control valve at an operation point, the opening degrees being determined depending on the speed control output signal and the extraction pressure control output signal,
 wherein a scale of the extraction pressure control output signal in the extraction map is modified by multiplying the scale by a value that is derived by dividing the extraction flow rate target value with an extraction flow rate actual value, and operation signals for operating the governor valve and the extraction control valve are generated with reference to the modified extraction map.

2. The operation control apparatus for a steam turbine according to claim 1, wherein a scale of the speed control output signal in the extraction map is modified by multiplying the scale of the speed control output signal by a value that is derived by dividing an output actual value with an output target value, and operation signals for operating the governor valve and the extraction control valve are generated with reference to the modified extraction map.

3. An operation control apparatus for a steam turbine including at least a high-pressure turbine and a low-pressure turbine, the steam turbine further including a governor valve that controls a flow rate of steam to be supplied to the high-pressure turbine, and an extraction control valve that controls a flow rate of steam to be supplied from the high-pressure turbine to the low-pressure turbine, the operation control apparatus comprising:
 a speed controller that generates a speed control output signal based on an output target value of the steam turbine and a detected speed of the steam turbine;
 an extraction pressure controller that generates an extraction pressure control output signal based on an extraction flow rate target value of the steam turbine and a detected extraction pressure of the steam turbine; and
 an extraction map for deriving opening degrees of the governor valve and the extraction control valve at an operation point, the opening degrees being determined depending on the speed control output signal and the extraction pressure control output signal,
 wherein a scale of the speed control output signal in the extraction map is modified by multiplying the scale by a value that is derived by dividing an output actual value with an output target value, and operation signals for operating the governor valve and the extraction control valve are generated with reference to the modified extraction map.

4. An operation control method for a steam turbine including at least a high-pressure turbine and a low-pressure turbine, the steam turbine further including a governor valve that controls a flow rate of steam to be supplied to the high-pressure turbine, and an extraction control valve that controls a flow rate of steam to be supplied from the high-pressure turbine to the low-pressure turbine, the operation control method comprising:
 a speed control step of generating a speed control output signal based on an output target value of the steam turbine and a detected speed of the steam turbine;
 an extraction pressure control step of generating an extraction pressure control output signal based on an extraction flow rate target value of the steam turbine and a detected extraction pressure of the steam turbine; and
 an operation signal generation step of generating operation signals for operating the governor valve and the extraction control valve with reference to an extraction map for deriving opening degrees of the governor valve and the extraction control valve at an operation point, the opening degrees being determined in the extraction map depending on the speed control output signal and the extraction pressure control output signal,
 wherein a scale of the extraction pressure control output signal in the extraction map is modified by multiplying the scale by a value that is derived by dividing the extraction flow rate target value with an extraction flow rate actual value.

5. The operation control method for a steam turbine according to claim 4, wherein a scale of the speed control output signal in the extraction map is modified by multiplying the scale of the speed control output signal by a value that is derived by dividing an output actual value with an output target value.

6. An operation control method for a steam turbine including at least a high-pressure turbine and a low-pressure turbine, the steam turbine further including a governor valve that controls a flow rate of steam to be supplied to the high-pressure turbine, and an extraction control valve that controls a flow rate of steam to be supplied from the high-pressure turbine to the low-pressure turbine, the operation control method comprising:
 a speed control step of generating a speed control output signal based on an output target value of the steam turbine and a detected speed of the steam turbine;
 an extraction pressure control step of generating an extraction pressure control output signal based on an extraction flow rate target value of the steam turbine and a detected extraction pressure of the steam turbine; and
 an operation signal generation step of generating operation signals for operating the governor valve and the extraction control valve with reference to an extraction map for deriving opening degrees of the governor valve and the extraction control valve at an operation point, the opening degrees being determined in the extraction map depending on the speed control output signal and the extraction pressure control output signal,
 wherein a scale of the speed control output signal in the extraction map is modified by multiplying the scale by a value that is derived by dividing an output actual value with an output target value.

* * * * *